Dec. 14, 1943.  B. HAYTER  2,336,730
THERMOSTATIC FLOAT VALVE ADJUSTMENT
Filed Jan. 18, 1941
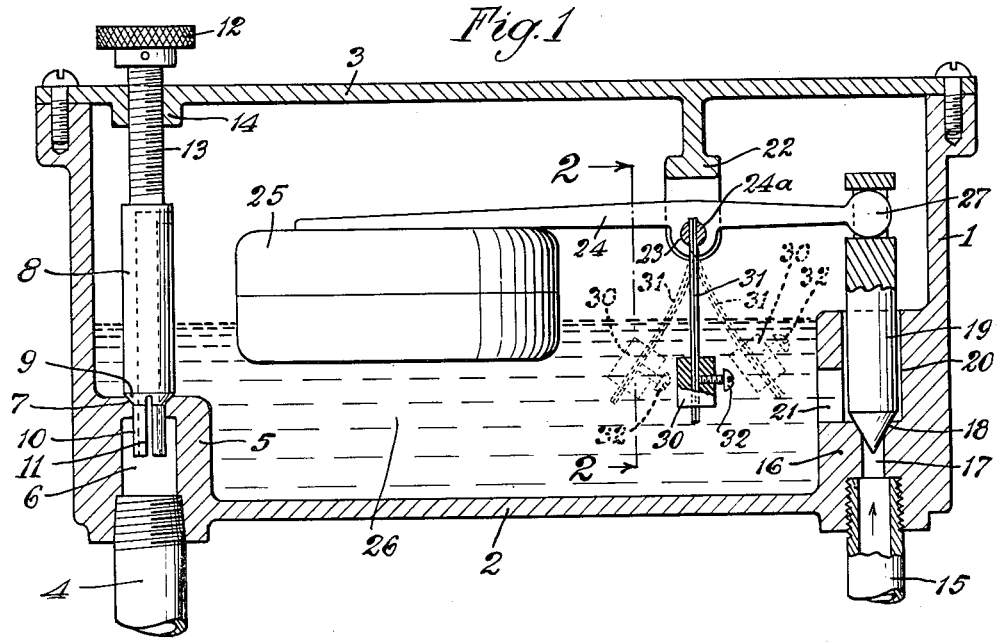
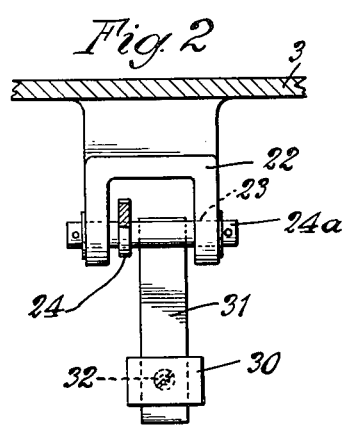
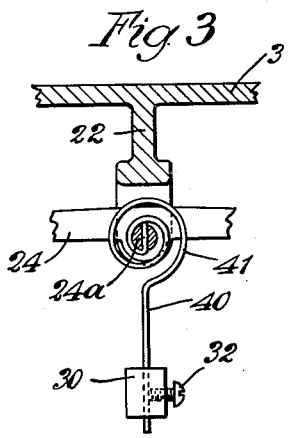
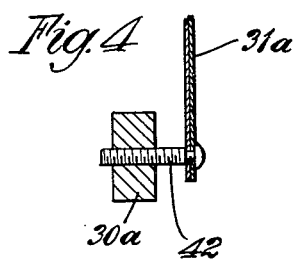
Inventor
Bruce Hayter
by Parker & Carter
Attorneys.

Patented Dec. 14, 1943

2,336,730

UNITED STATES PATENT OFFICE 2,336,730

THERMOSTATIC FLOAT VALVE ADJUSTMENT

Bruce Hayter, Santa Fe, N. Mex., assignor to Oil Devices, Santa Fe, N. Mex., a limited partnership of Illinois Application January 18, 1941, Serial No. 375,083

6 Claims. (Cl. 137—68)

My invention relates to an improvement in control valves operable for example for liquid fuel lines, and has for one purpose to compensate for changes in room temperature.

Another purpose is the provision of automatic means which, without attention from the operator, will in effect vary the weight of the float or make the float act as if its weight had been varied, so as to increase the head of oil at lower temperatures to compensate for the increasing viscosity of the oil, and similarly to diminish the head of oil at higher temperatures when the viscosity of the oil is reduced.

Other purposes will appear from time to time in the course of the specification and claims.

I illustrate my invention more or less diagrammatically in the accompanying drawing wherein:

Fig. 1 is a vertical longitudinal section through a float chamber embodying my invention;

Fig. 2 is a section on the line 2—2 of Fig. 1;

Fig. 3 illustrates a variant form of the device; and

Fig. 4 illustrates a variant weight adjustment.

Like parts are indicated by like symbols throughout the specification and drawing.

Referring to the drawing, 1 generally indicates a float chamber having a bottom portion 2 and a preferably removable cover 3. 4 is a fuel outlet line aligned with a sleeve 5, having a bore 6 and a valve seat 7 adapted to cooperate with a movable valve element 8, which may have a conic valve seat engaging portion 9, and a downward extension 10, provided with any suitable metering slot or slots 11.

It will be understood that the valve 8 may be made to respond in any suitable manner to temperature conditions, as by any suitable thermostatic control, but for purpose of illustration, since it does not of itself form part of the present invention, I illustrate it as adjusted manually by means of the exterior knob 12 and the screw threaded portion 13, in mesh with any suitable screw threaded sleeve 14, mounted on or forming part of the cover 3.

15 is any suitable fuel inlet line from any suitable source of liquid fuel not herein shown. It is aligned with a sleeve 16 having a bore 17 and a valve seat 18. The valve 19 is slidably or vertically movable in an upper bore 20. 21 indicates a liquid fuel outlet to the interior of the housing.

22 is any suitable bracket, herein shown as mounted on the cover 3, which, however, may equally readily be mounted on the housing itself. Pivoted in it, as at 23, is the float lever 24, having at one end a float 25 responsive to the level of the fuel 26 in the chamber. The opposite arm of the lever has a loose connection 27 with the top of the valve 19. It will be understood that, when the level of the fuel 26 rises, it lifts the float 25 and eventually moves the valve 19 into shutoff position, thus limiting further inflow of fuel along the line 15.

Experience indicates that the change in viscosity of the fuel in response to changes in temperature sufficiently affects the flow of fuel through the outlet valve passage to effect the metering of the oil. Therefore, when the temperature drops, a higher head of fuel is desirable in order to maintain a corresponding flow through a given valve orifice. I therefore provide means for varying the response of the float 25 to the fuel 26, thus requiring a greater head of fuel to cut off the valve 19 in cold than in hot weather. I may, for example, obtain this result by employing a weight 30, which is herein shown as mounted on a warping bar 31, which in turn is mounted on and moves with the lever 24, or a shaft 24a movable with the lever.

If desired, the weight 30 may be adjustable along the warping bar 31, a set screw 32 for example being employed to set it at any desired adjustment. The parts are so proportioned that, in response to a temperature drop, the weight 30 and the warping bar 31 move toward the float 25, to the left hand dotted line position of Fig. 1. This reduces the lifting effect of the float 25 and necessitates a greater head of oil 26 to close the valve 19. This greater head of oil is then effective to maintain the desired flow past the valve 19, even though the cold temperature increases the viscosity of the fuel. On the other hand, when the temperature rises above a predetermined normal or intermediate temperature, the warping bar 31 warps in the opposite direction to the right hand dotted line position of Fig. 1, and this increases the lifting effect of the float 25 and causes the valve 19 to close in such fashion as to maintain a lower head of oil to compensate for a reduced viscosity of the fuel.

It will be realized that, whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

For example, in Fig. 3 I illustrate a bimetallic strip 40, having a spiral portion 41 at its upper end, surrounding the shaft 24a prior to its connection thereto. In Fig. 4 I illustrate a variant form of adjustment of weight, a weight 30a being laterally adjustable in relation to the bimetal strip 31a, as for example by being in the form of a nut screw threaded upon a screw 42.

It will be further understood that, whereas I have illustrated the bimetal member as actually in the float chamber and thus largely responsive to the temperature of the liquid fuel, it may be placed at any other suitable point and may respond, if desired, directly to changes in air temperature.

I claim:

1. In valve control means for liquid burners and the like, a float chamber, a fuel discharge line extending from said float chamber, means for controlling the flow of fuel therethrough, a fuel inlet line extending to said float chamber, a valve therefor, a float, a lever connecting said float and valve, and means responsive to changes in temperature of the fuel for varying the response of said float to liquid fuel within said float chamber and for thereby varying the level of fuel in the float chamber necessary to lift the float sufficiently to close said valve, including a separate thermostatically responsive element normally movable in unison with the float and separate from but movable unitarily with the lever connecting the float and valve.

2. In valve control means for liquid burners and the like, a float chamber, a fuel discharge line extending from said float chamber, means for controlling the flow of fuel therethrough, a fuel inlet line extending to said float chamber, a valve therefor, a float, a lever connecting said float and valve, and means responsive to changes in the temperature of the fuel for varying the response of said float to liquid fuel within said float chamber and for thereby varying the level of fuel in the float chamber necessary to lift the float sufficiently to close said valve, including a weight unitarily movable with said float, and temperature responsive means for varying the position of said weight in relation to said float.

3. In valve control means for liquid burners and the like, a float chamber, a fuel discharge line extending from said float chamber, means for controlling the flow of fuel therethrough, a fuel inlet line extending to said float chamber, a valve therefor, a float, a lever connecting said float and valve, and means responsive to changes in the temperature of the fuel for varying the response of said float to liquid fuel within said float chamber and for thereby varying the level of fuel in the float chamber necessary to lift the float sufficiently to close said valve, including a weight and a bimetallic member upon which said weight is mounted, said bimetallic member being mounted for unitary movement with said lever.

4. In valve control means for liquid burners and the like, a float chamber, a fuel discharge line extending from said float chamber, means for controlling the flow of fuel therethrough, a fuel inlet line extending to said float chamber, a valve therefor, a float, a lever connecting said float and valve, and means responsive to changes in the temperature of the fuel for varying the response of said float to liquid fuel within said float chamber and for thereby varying the level of fuel in the float chamber necessary to lift the float sufficiently to close said valve, including a bimetallic strip mounted for unitary movement with said lever and about the same axis and including a portion extending downwardly into the fuel in the float chamber, and a weight mounted on said bimetallic strip.

5. In valve control means for liquid burners and the like, a float chamber, a fuel discharge line extending from said float chamber, means for controlling the flow of fuel therethrough, a fuel inlet line extending to said float chamber, a valve therefor, a float, a lever connecting said float and valve, a shaft upon which said lever is fixed, pivoted supporting means for said shaft, and means responsive to changes in the temperature of the fuel for varying the response of said float to liquid fuel within the float chamber and for thereby varying the level of fuel in the float chamber necessary to lift the float sufficiently to close the valve, including a bimetallic strip mounted on and movable with said shaft, and a weight on said strip, said strip being adapted to move said weight toward or away from said float in response to temperature changes.

6. In valve control means for liquid burners and the like, a float chamber, a fuel discharge line extending from said float chamber, means for controlling the flow of fuel therethrough, a fuel inlet line extending to said float chamber, a valve therefor, a float, a lever connecting said float and valve, and means responsive to temperature changes for varying the response of said float to liquid fuel within said float chamber and for thereby varying the level of fuel in the float chamber necessary to lift the float sufficiently to close said valve, including a member unitarily movable with said float, and temperature responsive means for varying the position of said member in relation to said float, said temperature responsive means extending into the fuel in said float chamber.

BRUCE HAYTER.